US006911898B2

(12) United States Patent
Chung

(10) Patent No.: US 6,911,898 B2
(45) Date of Patent: Jun. 28, 2005

(54) SYSTEM FOR AUTOMATICALLY OPENING AND CLOSING A GARAGE DOOR AND A METHOD THEREOF

(75) Inventor: Ha-Yong Chung, Suwon (KR)

(73) Assignee: Hyundai Motor Company, Seoul (KR)

( * ) Notice: Subject to any disclaimer, the term of this patent is extended or adjusted under 35 U.S.C. 154(b) by 365 days.

(21) Appl. No.: 10/134,095

(22) Filed: Apr. 24, 2002

(65) Prior Publication Data

US 2003/0043021 A1 Mar. 6, 2003

(30) Foreign Application Priority Data

Aug. 31, 2001 (KR) ........................................ 2001-53467

(51) Int. Cl.[7] .......................... G05B 19/00; H04Q 5/22; E05F 15/00; E05F 15/20

(52) U.S. Cl. .................... 340/5.64; 340/5.61; 340/5.71; 340/5.2; 340/10.1; 160/188; 49/25

(58) Field of Search ................................ 340/5.64, 5.2, 340/5.61, 5.71, 10.1, 505; 160/188; 49/24; 455/41.1, 41.2

(56) References Cited

U.S. PATENT DOCUMENTS 6,559,775 B1 * 5/2003 King .......................... 340/5.2
6,615,132 B1 * 9/2003 Nagasaka et al. ........ 340/932.2
6,634,408 B2 * 10/2003 Mays .......................... 160/188
2002/0135461 A1 * 9/2002 Nuesser et al. ........... 340/5.64

FOREIGN PATENT DOCUMENTS

DE 2990 1677.3 1/1999

* cited by examiner

*Primary Examiner*—Brian Zimmerman
*Assistant Examiner*—Clara Yang
(74) *Attorney, Agent, or Firm*—Morgan Lewis & Bockius LLP

(57) ABSTRACT

A system for opening and closing a garage door is provided. The system includes a vehicle communication module mounted to a vehicle, and a garage communication module, the vehicle communication module and the garage communication module preferably performing Bluetooth™ communication. On the basis of the communication of a vehicle identifier and engine state information, a garage door can be automatically opened and closed.

8 Claims, 2 Drawing Sheets

SYSTEM FOR AUTOMATICALLY OPENING AND CLOSING A GARAGE DOOR AND A METHOD THEREOF

FIELD OF THE INVENTION

The present invention relates to a system for automatically opening and closing a garage door, and more particularly, to a system using a wireless communication network for automatically opening and closing a garage door.

BACKGROUND OF THE INVENTION

Generally, a driver opens and closes a door of a garage for himself when he intends to park his car in the garage. However, to open and close the door of the garage by hand is inconvenient and troublesome in many cases. Automatic garage door openers have been developed, but still have disadvantages, including small hand-held controllers that can be lost and require the driver to remove his hand from the wheel to depress a button. Such controllers also typically run on batteries that can unexpectedly run down, rendering the garage door inoperable from the vehicle.

SUMMARY OF THE INVENTION

In a preferred embodiment of the present invention, a system for opening and closing a garage door comprises vehicle and garage controllers and communication modules, as well as a garage door opening device. The vehicle controller controls operation of the vehicle and detects vehicle information such as the engine operation state. The vehicle module is mounted on the vehicle and is provided with an input port through which the vehicle information is input. The garage module has an output port and performs wireless communication with the vehicle module. The garage controller generates a garage door opening/closing control signal using data input from the output port of the garage module according to whether the vehicle is registered or not. The garage door opening/closing device is actuated by the garage door opening/closing control signal input from the garage controller. In a further preferred embodiment, both the vehicle module and the garage module are Bluetooth™ wireless communication modules.

In an alternative preferred embodiment of the invention, a vehicle state monitor is disposed in a vehicle to receive information regarding the vehicle engine state. This monitor may comprise a vehicle controller. A vehicle communication module is also disposed in the vehicle and receives the engine state information from the vehicle state monitor. This module further contains a unique vehicle identifier. A garage communication module is associated with the garage door. The vehicle and garage communication modules provide for wireless communication between each other. Preferably, the communication protocol may be Bluetooth™ wireless communications. A garage door unit communicates with the garage communication module and cooperates with the garage door to open and close the door in response to information regarding the engine state and vehicle identifier received from the garage communication module as transmitted from the vehicle communication module.

Preferably, the garage door unit comprises a garage door controller and a door opening and closing device. The garage door controller communicates with the garage communication module and generates a door open or close signal based on the received vehicle identifier and engine state information. The garage door opening and closing device communicates with the controller to open or close the door in response to the signal generated thereby.

In an another preferred embodiment of the present invention, a method is provided for automatically opening and closing a garage door via wireless communication between a garage communication module and a vehicle communication module. The method may comprise querying for a unique identifier of a vehicle that approaches a garage, detecting the querying for the unique identifier of the vehicle, transmitting the identifier of the vehicle if the querying is detected, comparing the transmitted identifier of the vehicle to a predetermined registered identifier, querying for vehicle information such as an engine operating state if the transmitted identifier is identical to the predetermined registered identifier, detecting the querying for the vehicle information, transmitting vehicle information if the querying is detected, and analyzing the transmitted vehicle information and generating a garage door opening/closing control signal according to the engine operating state.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

A system for automatically opening and closing the door of a garage according to the preferred embodiment of the present invention uses Bluetooth™ wireless communication modules. Bluetooth™ is the name given to a technology standard using short-range radio links, which is intended to replace the cables(s) connecting portable and/or fixed electronic device. Information regarding the protocol is available at www.bluetooth.com. While Bluetooth™ wireless communications may be employed ina preferred embodiment of the invention, the invention is not limited thereto, any suitable local wireless communication system or protocl may be used by a person of ordinary skill in the art.

Figure 1:
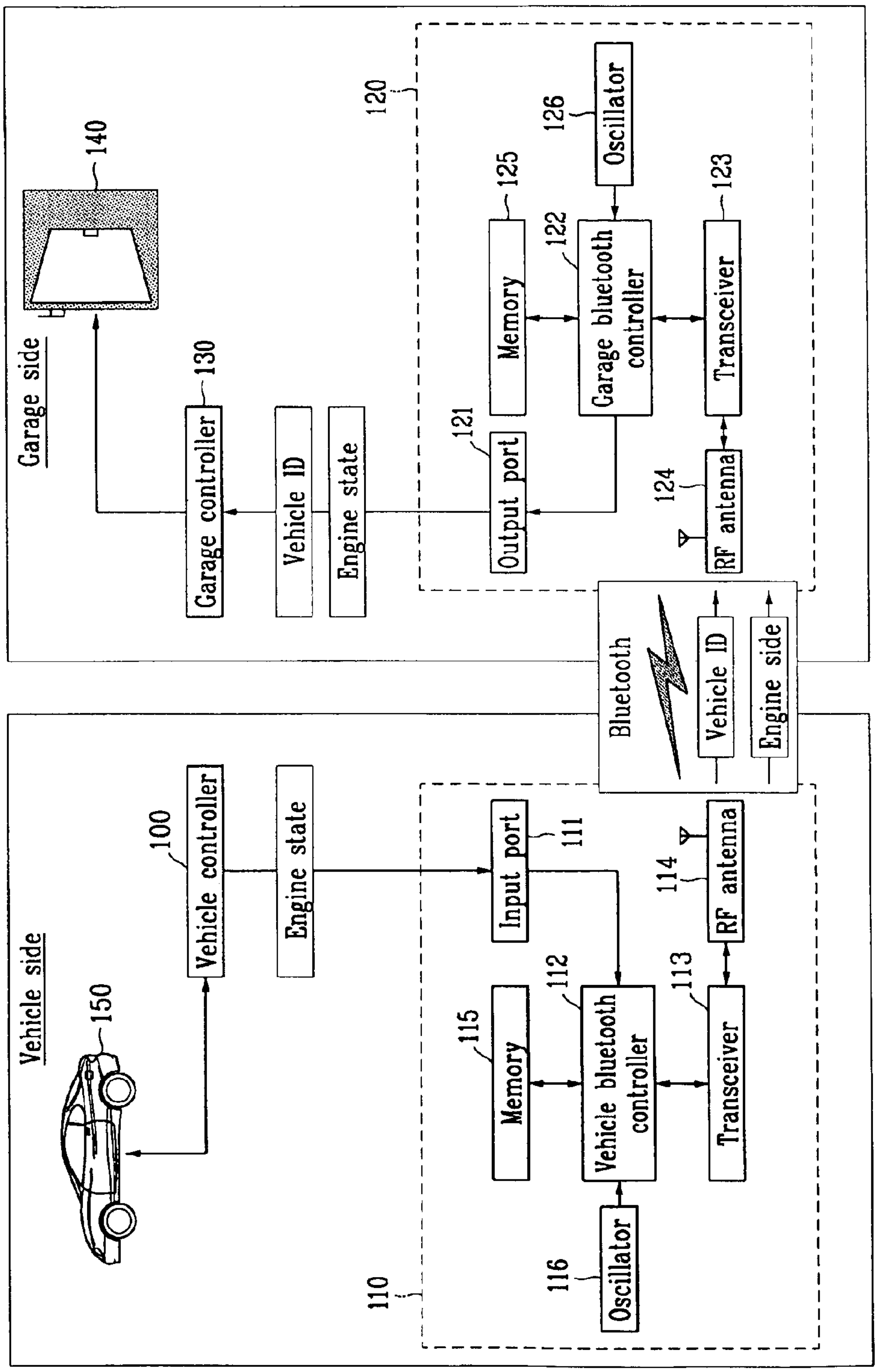
FIG. 1 schematically illustrates a system for automatically opening and closing a door of a garage according to the preferred embodiment of the present invention.

As shown in FIG. 1, the system for automatically opening and closing the door of a garage according to the preferred embodiment of the present invention includes a vehicle controller 100, a vehicle communication module 110, a garage communication module 120, a garage controller 130 and a garage door opening/closing device 140.

The vehicle controller 100 generally controls operation of vehicle 150, and it is connected to an input port 111 in order to input vehicle operating information such as an engine operating state to the vehicle communication module 110. Alternatively, a monitoring unit (not shown) communicates with a vehicle controller or relevant vehicle state sensors to monitor vehicle or engine state, and communicates such information to vehicle communication module 110. Such a monitoring unit may be a separate component or integrated into vehicle communication module 110.

The garage controller 130 analyzes vehicle information input from an output port 121 of the garage communication module 120, and generates an opening or closing control signal of the garage door according to the vehicle identification and an engine operating state. For this purpose controller 130 preferably includes a conventional processor (CPU) and memory.

If the garage controller 130 determines that the vehicle 150 approaching the garage is a registered vehicle, it generates an opening or a closing signal according to whether the vehicle is coming into the garage or going out of the garage, and the vehicle operating condition. When the registered vehicle is entering the garage, the garage controller 130 determines whether the engine is operating by analyzing engine condition information transmitted from the garage communication module 120. If it is determined that the engine is in an on state, the garage controller 130 provides an opening signal to the garage door opening/closing device 140.

When the registered vehicle is in the garage and its engine is off, the garage controller 130 provides a closing signal to the garage door opening/closing device 140, and if the engine of the registered vehicle parked in the garage starts to operate, the garage controller 130 provides an opening signal to the garage door opening/closing device 140.

If the registered vehicle deviates from the local wireless communication range, the garage controller 130 provides a closing signal to the garage door opening/closing device 140. Therefore, the garage door opening/closing device 140 opens or closes the door of the garage according to the opening or closing signal input from the garage controller 130.

With reference to FIG. 1, the vehicle communication module 110 and the garage communication module 120 will be explained in detail hereinafter.

The vehicle communication module 110 comprises the input port 111, a vehicle communication controller 112, a transceiver (RF(Radio Frequency) transmitter/receiver) 113, an RF antenna 114, a memory 115, and an oscillator 116.

The vehicle communication controller 112 is connected to the vehicle control device 100 via the input port 111, and a vehicle operation command signal such as an engine starting signal and a result of the signal are input to the vehicle communication controller 112 through the input port 111.

The vehicle communication controller 112 transforms data input from the vehicle controller 100 into a predetermined type of data packet, and transmits the data packet on a predetermined frequency band through the transceiver 113. The transceiver 113 amplifies the data packet generated by the vehicle communication controller 112 into a predetermined frequency band and transmits the amplified data packet. On the other hand, when receiving, the transceiver 113 transforms the received signal into a low frequency band and provides it to the vehicle communication controller 112. The memory 115 includes a read only memory (ROM) for storing a program having control data, a nonvolatile memory storing vehicle information, and a random access memory (RAM) for temporarily storing data generated while the program is executed. The oscillator 116 is a quartz vibrator that provides a constant frequency created by an inherent frequency of a quartz plate to the vehicle communication controller 112. The garage communication module 120 comprises an output port 121, a garage communication controller 122, a transceiver (RF(Radio Frequency) transmitter/receiver) 123, an RF antenna 124, a memory 125, and an oscillator 126.

The garage communication controller 122 is connected to the garage control device 130 via the output port 121, and it transmits control signals input from the vehicle communication module 110 and data signals resulting from the control signals to the garage controller 130. The transceiver 123 sends the data packet after amplifying it into a predetermined frequency band. On the other hand, when receiving, the transceiver 123 transforms a received signal into a low frequency band and provides it to the garage communication controller 122. The memory 125 includes a read-only memory (ROM) for storing a program having control data, a nonvolatile memory storing vehicle information, and a random-access memory (RAM) for temporarily storing data generated while the program is executed. The oscillator 126 is a quartz vibrator that provides a constant frequency created by an inherent frequency of a quartz plate to the vehicle communication controller 122.

In the above stated system, if a vehicle provided with the vehicle communication module 110 that has already registered approaches a garage provided with the garage communication module 120, the door of the garage is automatically opened. The door of the garage is automatically closed if the engine of the vehicle is turned off after parking in the garage. Then, if the engine of the vehicle is on, the door of the garage is automatically opened. If the vehicle deviates from the wireless communication range of the communication module, the door of the garage is automatically closed.

Each communication module has a unique identifier. In a preferred embodiment, as illustrated in FIG. 1 wherein the communication modules are Bluetooth™ modules, each Bluetooth™ module has an inherent number according to the Bluetooth™ protocol. The inherent number of the vehicle Bluetooth™ module 100 can be set as an inherent number (ID) of the vehicle. In this preferred embodiment of the present invention, the garage Bluetooth™ module 120 automatically queries for an inherent number of the vehicle 150. The user can register the inherent number as a key device.

Figure 2:
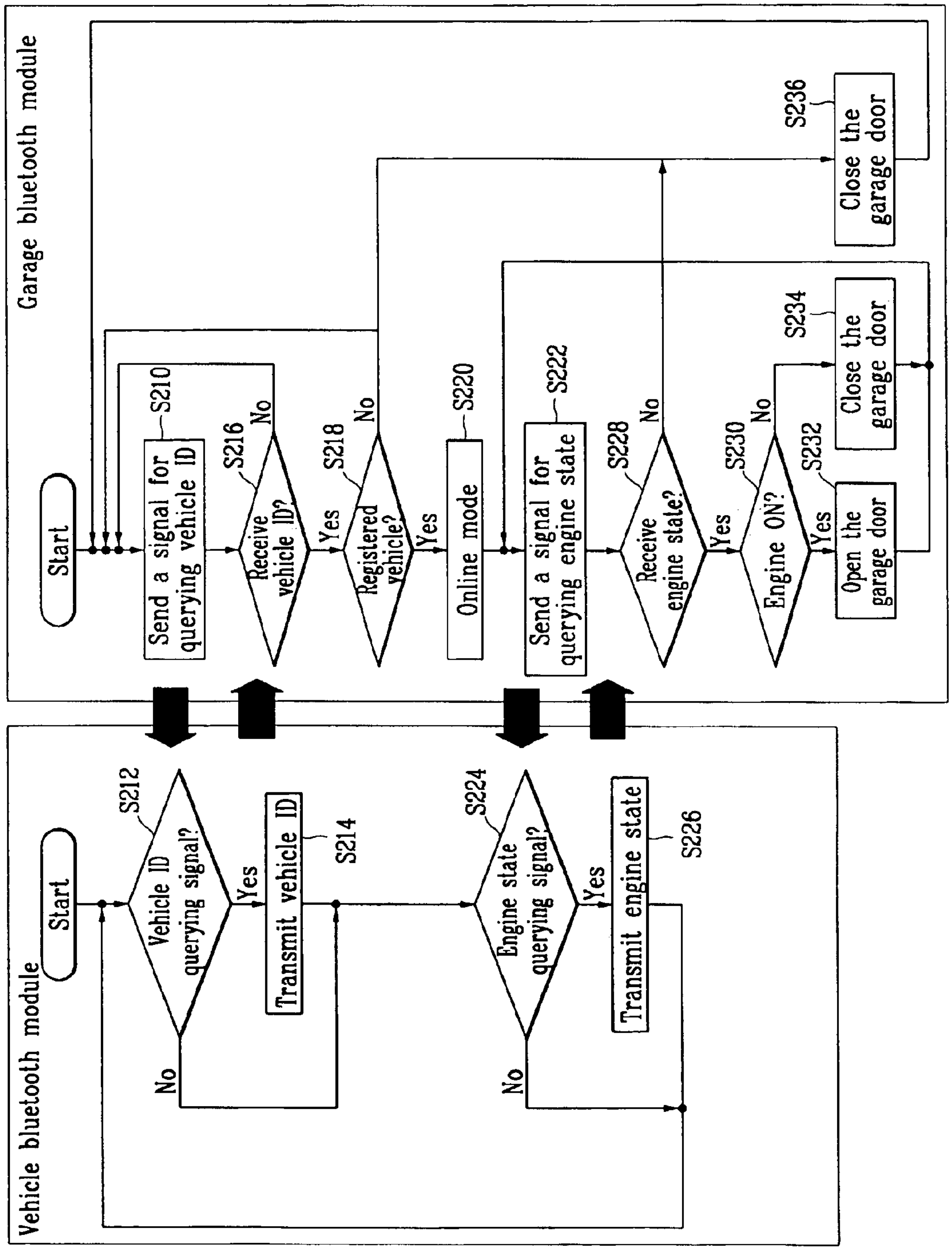
FIG. 2 is a flowchart showing a control process for automatically opening and closing the garage door according to the preferred embodiment of the present invention.

Referring to FIGS. 1 and 2, a process for automatically opening/closing the garage door will be explained.

If the vehicle 150 approaches a garage that has the registered key device of the unique identifier of the vehicle 150, local wireless communication is performed between the vehicle communication module 110 and the garage communication module 120. First, the garage communication module 120 queries for the unique identifier, e.g., an inherent number, of the vehicle 150 (S210). Then, the vehicle communication module 110 determines whether the signal for querying for its unique identifier has been generated (S212). If it is determined that the signal is querying for its unique identifier, the vehicle communication module 110 sends its unique identifier to the garage communication module 120 (S214).

The garage communication module 120 determines whether the vehicle unique identifier is input and whether the vehicle is a registered vehicle, using the input unique identifier of the vehicle (S216 and S218). If the input unique identifier of the vehicle is not the identifier of a registered vehicle in step S218, the procedure advances to step S236 where the garage communication module 120 provides a garage door close control signal to the garage controller 130.

If it is determined that the approaching vehicle is a registered vehicle, the mode of the communication module is changed to an online mode (S220), and the garage communication module 120 maintains connection with the vehicle communication module 110 during the online mode.

Then, the garage communication module 120 queries for vehicle information such as an engine state of the registered vehicle (S222). If the vehicle communication module 110 detects the query for the vehicle information from the garage communication module 120 (S224), the vehicle communication module 110 sends vehicle information input from the vehicle controller 100 (S226).

The garage communication module 120 determines whether the vehicle information is input from the vehicle communication module 110 in step S228, and if it is determined that the vehicle information is input, the garage communication module 120 determines, using the input vehicle information, whether the engine of the vehicle is on (S230).

If it is determined that the engine is on in step S230, the garage communication module 120 provides a garage door opening signal to the garage controller 130 (S232), and otherwise, the garage communication module 120 provides a garage door closing signal to the garage controller 130 (S234).

As stated above, the garage controller 130 is provided a garage door opening/closing signal from the garage communication module 120, and it actuates the garage door opening/closing device 140 such that the door of the garage is automatically opened.

If the engine of the vehicle is turned off after parking in the garage, the garage controller 130 actuates the garage door opening/closing device 140, through the above stated process, such that the door of the garage is closed. If the engine of the vehicle 150 is turned on while it is parked in the garage, the garage controller 130 actuates the garage door opening/closing device 140, through the above stated process, such that the door of the garage is opened. In addition, when the vehicle deviates from the wireless communication range, the garage door opening/closing device 140 is controlled such that the door of the garage is automatically closed.

As stated above, the apparatus and method according to the preferred embodiment of the present invention automatically opens and closes the door of the garage using local wireless communication so that entering or exiting the garage becomes much more convenient for the driver.

What is claimed is:

1. A system for automatically opening and closing a garage door, comprising:

a vehicle controller for controlling an operation of a vehicle and detecting vehicle information comprising an engine operation state;

a vehicle communication module mounted on the vehicle, said vehicle module being provided with an input port through which said vehicle information is input and containing an indicator that the vehicle is a registered vehicle;

a garage communication module having an output port, said garage module performing wireless communication with the vehicle module;

a garage controller generating a garage door opening/closing control signal using data input from said output port of said garage module according to whether the vehicle is registered or not wherein said garage controller generates the garage door opening/closing control signal according to an operating state of the vehicle that enters or exits a garage if the vehicle is registered; and a garage door opening/closing device actuated by the garage door opening/closing control signal input from said garage controller, wherein said garage controller analyzes engine information input from said garage communication module and provides the garage door opening control signal to the garage door opening/closing device if an engine of the vehicle operates.

2. The system of claim 1, wherein both said vehicle communication module and said garage communication module are Bluetooth™ communication modules.

3. A method for automatically opening and closing a garage, comprising:

querying for a unique identifier of a vehicle that approaches a garage;

detecting said querying for the unique identifier of the vehicle;

transmitting the unique identifier of the vehicle if said querying is detected;

comparing the transmitted unique identifier of the vehicle to a predetermined registered identifier;

querying for vehicle information, including engine operating state, if the transmitted unique identifier is identical to the predetermined registered identifier;

detecting said querying for the vehicle information;

transmitting vehicle information if said querying is detected; and analyzing said transmitted vehicle information and generating a garage door opening/closing control signal according to the engine operating state.

4. The method of claim 3, further comprising generating a garage door closing control signal if the unique identifier of the vehicle is not identical to the predetermined registered identifier in said comparing.

5. The method of claim 3, further comprising generating a garage door opening control signal if the engine of the vehicle starts to operate.

6. The method of claim 3, further comprising generating a garage door closing control signal if the engine of the vehicle stops.

7. The method of claim 3, wherein said querying and transmitting occur via wireless communication.

8. The method of claim 7, wherein said wireless communication employs a Bluetooth™ protocol.

* * * * *